United States Patent
Ito

(10) Patent No.: US 7,984,315 B2
(45) Date of Patent: Jul. 19, 2011

(54) EXTERNAL STORAGE DEVICE AND POWER MANAGEMENT METHOD FOR THE SAME

(75) Inventor: Hirotaka Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 783 days.

(21) Appl. No.: 11/665,856

(22) PCT Filed: Oct. 24, 2005

(86) PCT No.: PCT/JP2005/019504
§ 371 (c)(1),
(2), (4) Date: Apr. 20, 2007

(87) PCT Pub. No.: WO2006/043699
PCT Pub. Date: Apr. 27, 2006

(65) Prior Publication Data
US 2007/0266270 A1    Nov. 15, 2007

(30) Foreign Application Priority Data
Oct. 22, 2004   (JP) .................. 2004-307671

(51) Int. Cl.
G06F 1/00    (2006.01)
G06F 1/26    (2006.01)
G06F 1/16    (2006.01)
G06F 3/00    (2006.01)
G06F 13/12   (2006.01)
G06F 12/00   (2006.01)
G11B 15/18   (2006.01)

(52) U.S. Cl. .......... 713/324; 713/300; 713/320; 360/69; 361/679.33; 361/679.37; 710/58; 710/71; 711/4; 711/115

(58) Field of Classification Search ................. 713/300, 713/320, 324; 360/69; 361/679.33, 679.37; 710/58, 71; 711/4, 115
See application file for complete search history.

(56) References Cited

U.S. PATENT DOCUMENTS
5,799,199 A    8/1998   Ito et al.
(Continued)

FOREIGN PATENT DOCUMENTS
EP    0 448 350 A2    9/1991
(Continued)

OTHER PUBLICATIONS

Chinese Office Action issued in Chinese Patent Application CN 200580034734.0, mailed May 9, 2008 and translation thereof.

(Continued)

Primary Examiner — Stefan Stoynov
(74) Attorney, Agent, or Firm — McDermott Will & Emery LLP

(57) ABSTRACT

An external storage device includes a media control section (10), a monitoring section (20), an interface section (30) and a power control section (40). The media control section (10) drives a recording media and performs data access to the recording media. The monitoring section (20) monitors whether the data access by the media control section (10) can be performed or not. The interface section (30) performs communication with a host device. When the monitoring section (20) detects that the data access can not be performed, the power control section (40) limits power supply to the interface section (30). When the monitoring section (20) detects that the data access can be performed, the power control section (40) re-starts the power supply.

18 Claims, 5 Drawing Sheets

U.S. PATENT DOCUMENTS

| | | | |
|---|---|---|---|
| 6,249,864 B1 * | 6/2001 | Ito | 713/2 |
| 6,891,691 B2 * | 5/2005 | Winarski et al. | 360/73.03 |
| 7,124,248 B2 * | 10/2006 | Huffman et al. | 711/115 |
| 7,328,356 B2 * | 2/2008 | Igari | 713/320 |
| 2001/0005891 A1 | 6/2001 | Nakamura | |
| 2003/0163617 A1 | 8/2003 | Shigenobu | |
| 2005/1023517 | 10/2005 | Igari | |
| 2005/0289368 A1 * | 12/2005 | Chang et al. | 713/300 |

FOREIGN PATENT DOCUMENTS

| | | |
|---|---|---|
| JP | 9-50350 A | 2/1997 |
| JP | 2001-184170 A | 7/2001 |
| JP | 2001-184304 A | 7/2001 |
| JP | 2002-32162 | 1/2002 |
| JP | 2002-318646 A | 10/2002 |
| JP | 2002-334508 | 11/2002 |
| JP | 2004-152344 A | 5/2004 |
| JP | 2004-166094 A | 6/2004 |
| JP | 2004-234150 A | 8/2004 |
| JP | 2005-78514 | 3/2006 |

OTHER PUBLICATIONS

Notice of Reasons for Rejection, with English translation, issued in Japanese Patent Application No. 2006-543134, dated Feb. 16, 2010.

* cited by examiner

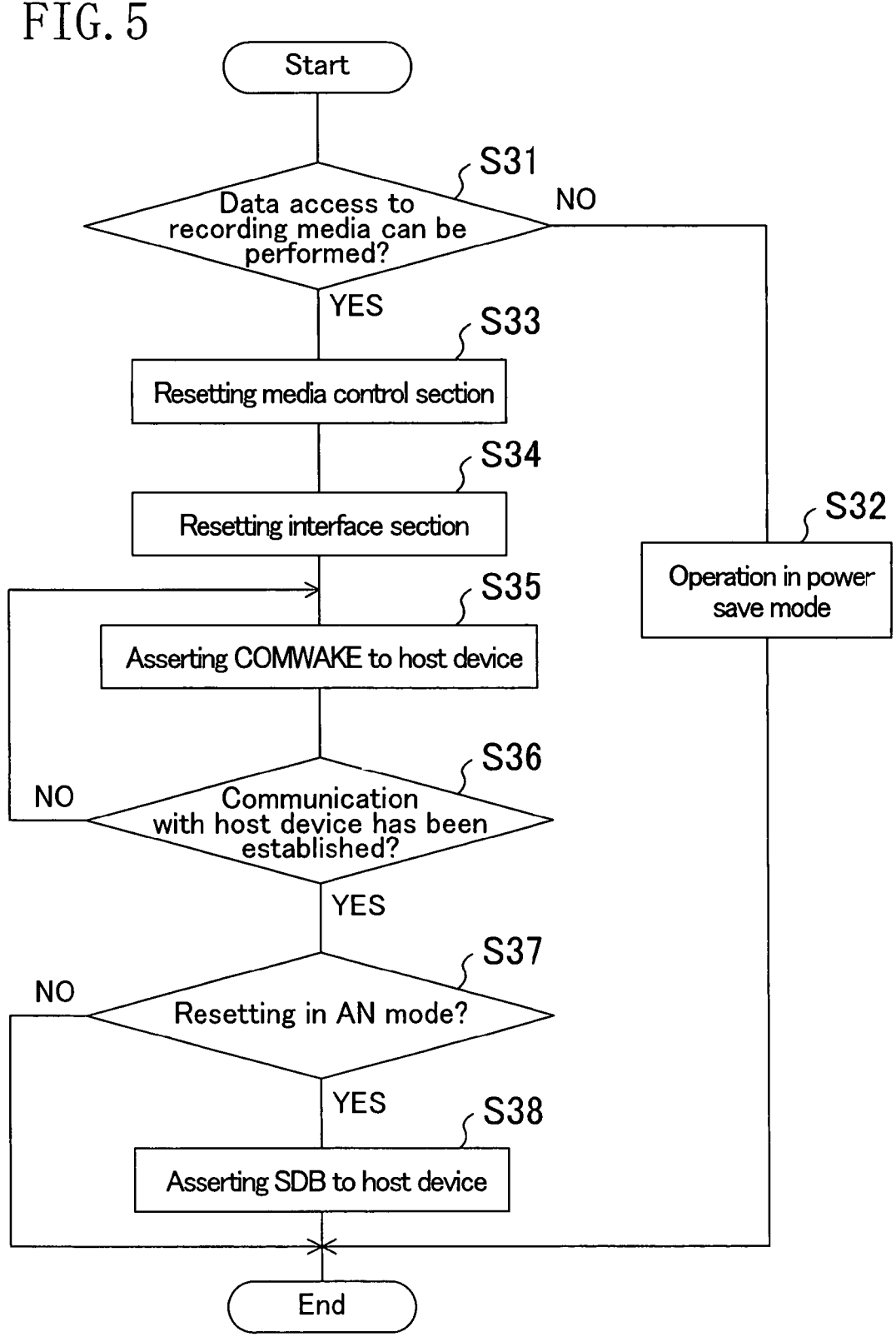

EXTERNAL STORAGE DEVICE AND POWER MANAGEMENT METHOD FOR THE SAME

RELATED APPLICATIONS

This application is a national phase of PCT/JP2005/019504 filed Oct. 24, 2005, which claims priority from Japanese Application Nos. 2004-307671 filed Oct. 22, 2004, the disclosures of which Applications are incorporated by reference herein.

TECHNICAL FIELD

The present invention relates to external storage devices, and more particularly relates to a power management technique for an external storage device including a Serial ATA interface.

BACKGROUND ART

Currently, as interfaces for external storage devices, low-cost interfaces such as ATA (AT Attachment) and ATAPI (AT Attachment Packet Interface) are widely used. In an ATA/ATAPI, a host device regularly monitors a state of an external storage device, an event generated in the external storage device and the like by polling.

Also, in an ATA/ATAPI, the external storage device shifts to a low power consumption mode basically in response to an instruction from a host device. This is because an ATA/ATAPI interface does not have the function of notifying an event generated in an external storage device from the external storage device to a host device in an asynchronous manner and the external storage device can not shift to a low power consumption mode at its own judgment. If an external storage device shifts to a low power consumption mode at its own judgment, the external storage device can not receive a packet command from a host device and thus can not be reset to a normal operation mode according to an instruction from the host device. Therefore, in order to realize effective power management for an external storage device including an ATA/ATAPI interface, problems on how an instruction from a host device is given to an external storage device in a low power consumption mode and how an external storage device is reset to a normal state have to be solved.

To solve the above-described problems, conventionally, when an ATA/ATAPI interface circuit is in a standby state or a sleep state, a command-packet automatically-receiving-sequence circuit in the ATA/ATAPI interface circuit receives a packet command from a host device and generates a sequence signal for receiving command packet data (see, for example, Patent Reference 1). Moreover, when an external storage device (optical disk device) is half stopped, a reset signal asserted by the host device is extracted from an ATAPI bus and, based on the asserted signal, the optical disk device is reset to a normal state (see for example, Patent Reference 2).

In recent years, as an interface for external storage devices, a Serial ATA interface to is becoming widely used. The Serial ATA standard is obtained by changing a parallel transfer method employed in the ATA/ATAPI standard into a serial transfer method and, according to the Serial ATA standard, data transfer is performed using a small amplitude difference signal. Thus, compared to an ATA/ATAPI interface, the Serial ATA standard provides excellent noise resistance and is suitable for increase in speed. Furthermore, the Serial ATA standard includes the function of power consumption control by an external storage device itself, the AN (asynchronous notification) function of asynchronously notifying a state of an external storage device from the external storage device to a host device and the like.

Patent Reference 1: Japanese Laid-Open Publication No. 2001-184304
Patent Reference 2: Japanese Laid-Open Publication No. 2002-318646

DISCLOSURE OF THE INVENTION

Problems that the Invention is to Solve

If an ATA/ATAPI interface as well as an interface section is completely turned to a low power consumption mode without receiving a command request for shift to a low power consumption mode from a host device, the ATA/ATAPI interface can not respond to polling from the host device and it is difficult to reset an external storage device from a low power consumption mode to a normal operation mode. Thus, in the ATA/ATAPI interface, suitable power consumption control according to a state of the external storage device can not be performed. Therefore, it is difficult in principle to reduce power in the interface section. The ATA/ATAPI standard, however, uses a parallel transfer method and does not require a large analog circuit which requires large power consumption in an interface section. Specifically, since the power consumption of an interface section is relatively small, the power consumption of the interface section does not particularly matter in terms of realizing low power consumption of the external storage device including an ATA/ATAPI interface.

On the other hand, the Serial ATA interface using a serial transfer method uses a high speed analog circuit which requires large power consumption in an interface section. Therefore, to realize reduction in power consumption of a Serial ATA interface, power consumption of an interface section has to be fully considered.

Moreover, as has been described, the Serial ATA standard includes the function of power consumption control by an external storage device itself. However, specifically when and how a device shifts to a low power consumption mode and when and how the device is reset to a normal operation mode are not formulated.

In view of the above described problems, it is an object of the present invention to provide a power management technique for an external storage device, specifically, for an external storage device including a Serial ATA interface, which is effective for a low power consumption operation.

Solution to the Problems

To solve the above-described problems, means has been devised as an external storage device which is operable to be connected to a host device to perform data communication with the host device and is operable to be switched between a normal operation mode and a power save mode. The device includes: a media control section for driving a recording media and performing data access to the recording media; a monitoring section for monitoring whether the data access by the media control section can be performed or not; an interface section for issuing, when the external storage device is operated in the normal operation mode and it is detected by the monitoring section that the data access can not be performed, a command of requesting permission for shift to the power save mode to the host device and notifying, when the external storage device is operated in the power save mode and it is detected by the monitoring section that the data access can be performed, the host device of shift to the normal operation; and a power control section for limiting, when the interface section receives notification of permission for shift to the power save mode from the host device, power supply to the interface section and re-starting, when a command of notifying the host device of shift to the normal operation mode is issued, the power supply.

According to the present invention, whether data access to a recording memory by the media control section is monitored by the monitoring section and a command for shift of an operation mode of the external storage device is issued from the interface section to the host device according to whether data access can be performed or not. A power state of the interface section is controlled according to the issuance of the command. In this control, when the external storage device is operated in the normal operation mode and notification of permission for shift to the power save mode is received from the host device, power supply to the interface section is limited and, when the external storage device is operated in the power save mode and the host device is notified of shift to the normal operation, the power supply is re-started. Thus, when data access to a recording media can be performed, the interface section is operated in a normal operation mode and, when data access to the recording media can not be performed, the interface section shifts to a low power consumption mode. Therefore, when data access to a recording media can not be performed, unnecessary power consumption can be reduced.

Specifically, when the recording media is not set in the external storage device, the monitoring section detects that the data access can not be performed and, when the recording media is set in the external storage device, the monitoring section detects that the data access can be performed.

According to the present invention, low power consumption control for the interface section is performed according to whether the recording media is set in the external storage device or not. Specifically, when the recording media is not set in the external storage device, power supply to the interface section is limited, so that unnecessary power consumption can be suppressed.

Specifically, when the recording media is not compatible with the external storage device, the monitoring section detects that the data access can not be performed and, when the recording media is compatible with the external storage device, the monitoring section detects that the data access can be performed.

According to the present invention, low power consumption for the interface section is performed according to whether the recording media is compatible or not. Specifically, when the recording media which has been set is not compatible with the external storage device, power supply to the interface section is limited, so that unnecessary power consumption can be suppressed.

Specifically, while the recording media is spinning up, the monitoring section detects that the data access can not be performed and, when the spinning up is completed, the monitoring section detects that the data access can be performed.

According to the present invention, low power consumption for the interface section is performed according to whether the recording media is spinning up or not. Specifically, while the recording media is spinning up, power supply to the interface is limited, so that unnecessary power consumption can be suppressed.

It is preferable that when the interface section receives the notification of permission for shift to the power save mode from the host device, the power control section limits power supply to the media control section and, when the command of notifying the host device of shift to the normal operation mode is issued, the power control section re-starts the power supply.

According to the present invention, when data access to the media control section can be performed, normal power supply to the media control section is performed and the media control section is operated in a normal operation mode. When data access to the recording media can not be performed, power supply to the media control section is limited and the media control section shifts to a low power consumption mode. Thus, when data access to the recording media can not be performed, unnecessary power consumption in the media control section can be reduced.

Moreover, the interface section preferably complies with a Serial ATA standard. It is preferable that when the interface section receives the notification of permission for shift to the power save mode from the host device, the power control section limits supply of a bias current by the interface section to a serial bus for connecting the host device and the external storage device and, when the command of notifying the host device of shift to the normal operation mode is issued, the power control section re-starts the supply of the bias current. Also, it is preferable that when the power control section limits the supply of the bias current, it is asynchronously notified to the host device that the external storage device is in a state where data access can not be performed and, when the power control section re-starts the supply of the bias current, it is asynchronously notified to the host device that the external storage device is in a state where data access can be performed.

According to the present invention, when the interface section complies with the Serial ATA standard, the supply of the bias current to the serial bus for connecting the host device and the external storage device is controlled by the power control section according to whether data access to the recording media can be performed or not. Specifically, when data access to the recording media can not be performed, the supply of the bias current to the serial bus is limited and unnecessary power consumption in the interface section is largely reduced. Moreover, whether data access to the external storage device according to a bias current supply state to the serial bus can be performed is asynchronously notified to the host device. Thus, the external storage device can shift to a low power consumption mode at its own judgment without receiving an instruction from the host device.

To solve the above-described problems, means has been devised as an external storage device. The device includes: a media control section for driving a recording media and performing data access to the recording media; a monitoring section for monitoring whether the data access by the media control section can be performed or not; and an interface section for asynchronously notifying, when the monitoring section detects that the data access can not be performed, the host device that the external storage device is in a state where data access can not be performed, and asynchronously notifying, when the monitoring section detects that the data access can be performed, the host device that the external storage device is in a state where data access can be performed, the interface section complying with a Serial ATA standard.

According to the present invention, whether data access to the recording media by the external storage device can be performed or not is asynchronously notified to the host device. Thus, the host device can recognize an operation state of the external storage device and, for example, can be properly operated according to the operation state of the external storage device. Therefore, unnecessary communication between the host device and the external storage device is reduced, so that power consumption of each of the host device and the external storage device can be reduced.

Moreover, to solve the above-described problems, means has been devised as a power management method for an external storage device which includes a media control section for driving a recording media and performing data access to the recording media and an interface section for performing communication with a host device and is operable to be switched between a normal operation mode and a power save mode. The method includes: a monitoring step of monitoring whether the data access by the media control section can be performed or not; a command issuing step of issuing, when the external storage device is operated in the normal operation mode and it is detected in the monitoring step that the data access can not be performed, a command of requesting permission for shift to the power save mode to the host device; and a power supply limiting step of limiting, when the notification of permission for shift to the power save mode is received from the host device, power supply to the interface section.

According to the present invention, when it is detected in the monitoring step that data access to the recording media by the media control section can not be performed, a command of requesting for permission for shift of an operation of the external storage device to a power save mode is issued to the host device in the command issuing step. Then, when notification of permission for the shift is received from the host device, power supply to the interface section is limited in the power supply limiting step. Thus, when data access to the recording media can not be performed, unnecessary power consumption in the interface section is suppressed.

Specifically, in the monitoring step, when the recording media is not set in the external storage device, it is judged that the data access can not be performed.

According to the present invention, when the recording media is not set in the external storage device, unnecessary operation of the interface section is not performed, so that power consumption can be suppressed.

Specifically, in the monitoring step, when the recording media is not compatible with the external storage device, it is judged that the data access can not be performed.

According to the present invention, when the recording media which has been set is not compatible with the external storage device, unnecessary operation of the interface section is not performed, so that power consumption can be suppressed.

Specifically, in the monitoring step, while the recording media is spinning up, it is judged that the data access can not be performed.

According to the present invention, while the recording media is spinning up, unnecessary operation of the interface section is not performed, so that power consumption can be suppressed.

It is preferable that in the power supply limiting step, when the notification of permission for shift to the power save mode is received from the host device, power supply to the media control section is limited.

According to the present invention, when data access to the recording media can not be performed, power supply to the media control section is limited, so that unnecessary power consumption in the media control section can be reduced.

Moreover, the interface section preferably complies with a Serial ATA standard. It is preferable that in the power supply limiting step, when the notification of permission for shift to the power save mode is received from the host device, supply of a bias current by the interface section to a serial bus for connecting the host device and the external storage device is limited. Also, it is preferable that the power management method further includes an asynchronous notification step of asynchronously notifying, when the supply of the bias current is limited in the power source control step, the host device that the external storage device is in a state where data access can not be performed.

According to the present invention, when the interface section complies with the Serial ATA standard and data access to the recording media can not be performed, supply of the bias current to the serial bus for connecting the host device and the external storage device is limited, so that unnecessary power consumption in the interface section can be largely reduced. Moreover, when the supply of the bias current to the serial bus is limited, it is asynchronously notified to the host device that the external storage device is in a state where data access can not be performed. Thus, the external storage device can shift to a low power consumption mode at its own judgment without receiving an instruction from the host device.

To solve the above-described problems, means which has been devised as a power management method for an external storage device which includes a media control section for driving a recording media and performing data access to the recording media and an interface section for performing communication with a host device and is operable to be switched between a normal operation mode and a power save mode. The method includes: a monitoring step of monitoring whether the data access by the media control section can be performed or not; a command issuing step of issuing, when the external storage device is operated in the power save mode and it is detected in the monitoring step that the data access can not be performed, a command of notifying the host device of shift to the normal operation mode; and a power supply re-starting step of re-starting, when the command of notifying the host device of shift to the normal operation mode is issued in the command issuing step, power supply to the interface section for which power supply has been limited.

According to the present invention, when it is detected in the monitoring step that data access to the recording media by the media control section can be performed, a command of notification of shift of an operation of the external storage device from a power save mode to a normal operation mode is issued to the host device in the command issuing step. When the command is issued, power supply to the interface section for which power supply has been limited is re-started in the power supply re-starting step. Thus, when data access to the recording media can be performed, the interface section is reset from a low power consumption mode to a normal operation mode and can be normally operated.

Specifically, in the monitoring step, when the recording media is set in the external storage device, it is detected that the data access can be performed.

According to the present invention, when the recording media is set in the external storage device, the interface section is reset to a normal operation mode and can be normally operated.

Specifically, in the monitoring step, when the recording media is compatible with the external storage device, it is detected that the data access can be performed.

According to the present invention, when the recording media which has been set in the external storage device is compatible with the external storage device, the interface section is reset to a normal operation mode and can be normally operated.

Specifically, in the monitoring step, when spinning-up of the recording media is completed, it is detected that the data access can be performed.

According to the present invention, when spinning-up of the recording media is completed, the interface section is reset to a normal operation mode and can be normally operated.

It is preferable that in the power supply re-starting step, when the command of notifying the host device of shift to the normal operation mode is issued in the command issuing step, power supply to the media control section for which power supply has been limited is re-started.

According to the present invention, when data access to the recording media can be performed, power supply to the media control section is re-started, so that the media control section is reset from a low power consumption mode to a normal operation mode and can be normally operated.

Moreover, the interface section preferably complies with a Serial ATA standard. It is preferable that in the power supply re-starting step, when the command of notifying the host device of shift to the normal operation mode is issued in the command issuing step, supply of a bias current to a serial bus for connecting the host device and the external storage device, for which bias current supply has been limited, is re-started. Also, it is preferable that the power management method further includes an asynchronous notification step of asynchronously notifying, when the supply of the bias current is re-started in the power supply re-starting step, the host device that the external storage device is in a state where data access can be performed.

According to the present invention, when the interface section complies with the Serial ATA standard, the supply of the bias current to the serial bus for connecting the host device and the external storage device is re-started and communication between the host device and the external storage device can be normally performed. When the supply of the bias current to the serial bus is re-stated, it is asynchronously notified to the host device that the external storage device is in a state where data access can be performed. Thus, the host device can recognize that the external storage device has been reset from a low power consumption mode to a normal operation mode and can issue to the external storage device a request for data access.

Effects of the Invention

As has been described, according to the present invention, effective power management for reduction in power consumption is realized for an external storage device. Specifically, when an external storage device complies with the Serial ATA standard, the external storage device shifts to a low power consumption mode. Thus, a bias current supplied to a serial bus for connecting a host device and the external storage device can be reduced, so that power consumption of the external storage device can be largely reduced.

BRIEF DESCRIPTION OF THE DRAWINGS

FIG. 5 is a flow chart showing steps for resetting an external storage device to a normal operation mode at its own judgment.

EXPLANATION OF REFERENCE NUMERALS

10 Media control section
20 Monitoring section
30 Interface section
40 Power control section

BEST MODE FOR CARRYING OUT THE INVENTION

Hereafter, best mode for carrying out the present invention will be described with reference to the accompanying drawings.

Figure 1:
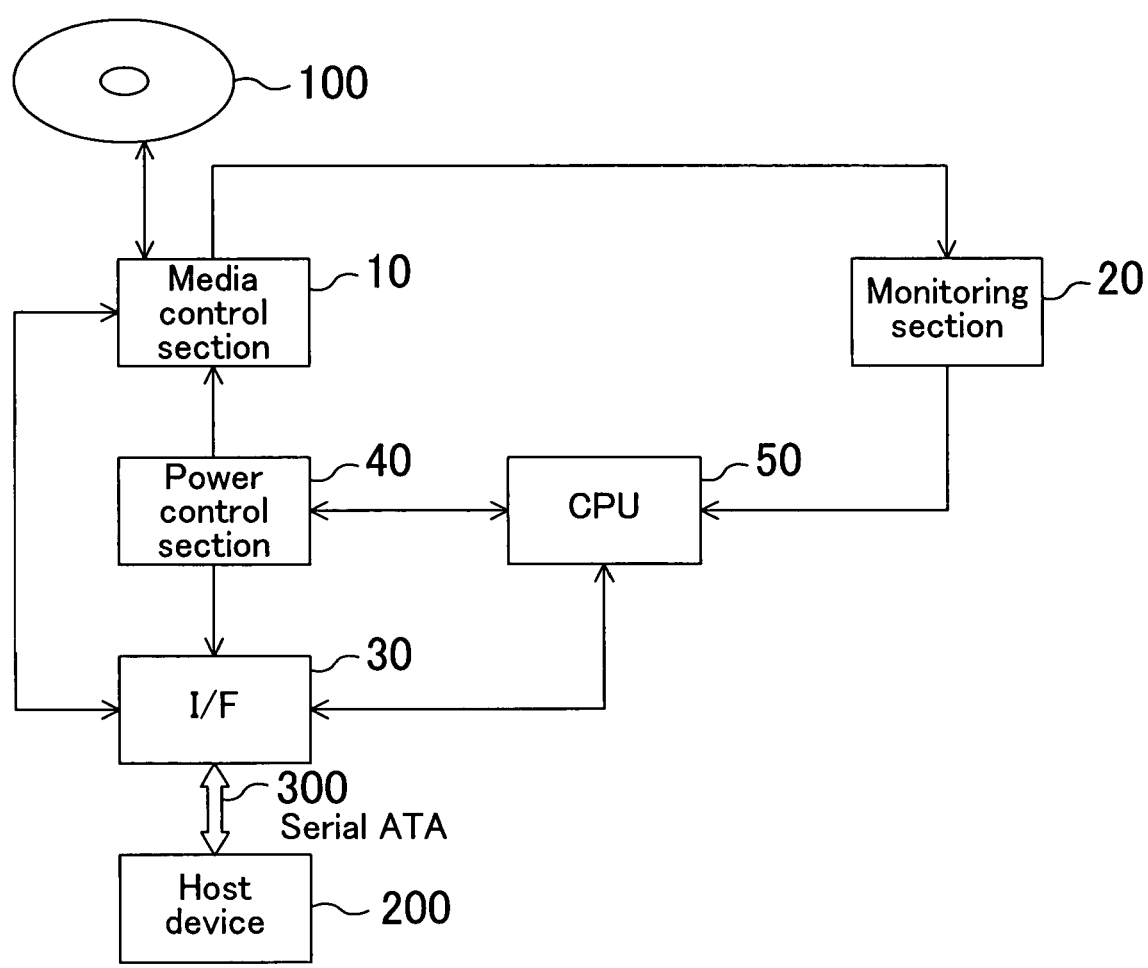
FIG. 1 is a block diagram illustrating an external storage device according to an embodiment of the present invention.

FIG. 1 is a block diagram illustrating an external storage device according to an embodiment of the present invention. The external storage device includes a media control section 10, a monitoring section 20, an interface section 30, a power control section 40 and a CPU 50.

The media control section 10 includes a power source for driving a recording media 100 set in the external storage device to a state where data access can be performed, a head as a contact portion to the recording media 100, a data processing block and the like. For example, assume that the external storage device is an optical disk. The media control section 10 includes a motor for rotary-driving an optical disk, an optical pickup for irradiating laser light to an optical disk, an error correction function and the like.

The monitoring section 20 monitors whether or not data access to the recording media 100 by the media control section 10 can be performed. For example, when the recording media 100 is not set in the external storage device, the monitoring section 20 detects that data access by the media control section 10 can not be performed. When the recording media 100 is set in the external storage device, the monitoring section 20 detects that data access by the media control section 10 can be performed.

The recording media 100 spins up for a while after being set. Then, while the spinning up is performed, the monitoring section 20 detects that data access of the media control section 10 can not be performed. After the spinning up has been completed, the monitoring section 20 detects that data access by the media control section 10 is now allowed.

If the recording media 100 which has been set is not compatible with the external storage device, data access by the media control section 10 can not be performed. Therefore, the monitoring section 20 identifies a type of recording media 100 which has been set and, if the type is compatible with the external storage device, the monitoring section 20 detects that data access by the media control section 10 can be performed. On the other hand, if the type is not compatible with the external storage device, the monitoring section 20 detects that data access by the media control section 10 can not be performed.

The interface section 30 performs data communication between the external storage device and a host device 200. The interface section 30 complies with the Serial ATA standard and is connected to the host device 200 via a serial bus 300.

Figure 2:
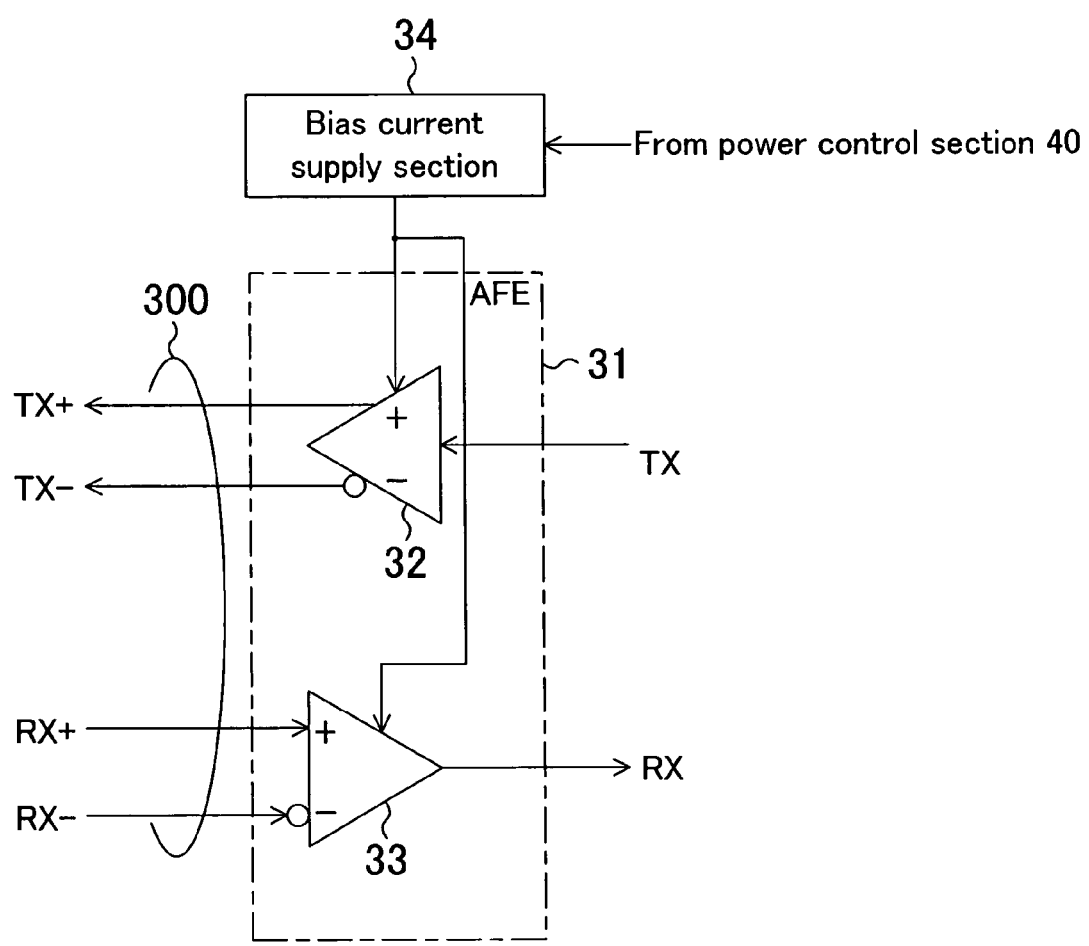
FIG. 2 is a block diagram illustrating part of an interface section around an analog front end section.

FIG. 2 is a block diagram illustrating part of the interface section 30 around an analog front end section (which will be hereafter referred to as an "AFE section"). A TX section 32 in the AEF section 31 converts a data signal TX, which has been obtained by reading an analog signal from the recording media 100 by the media control section 10, converting the analog signal into a digital signal, performing data processing to the digital signal and performing serial/parallel conversion to the digital data, to differential signals TX+ and TX− and sends the differential signals TX+ and TX− to the host device 200 via the serial bus 300. An RX section 33 receives differential signals RX+ and RX− from the host device 200 via the serial bus 300, converts the differential signals RX+ and RX− to a data signal RX and outputs the data signal RX to the CPU 50 and the like. A bias current supply section 34 supplies a bias current to the TX section 32 and the RX section 33 according to control by the power control section 40, which will be described later.

The power control section 40 turns each of the media control section 10 and the interface section 30 to a low power consumption mode according to control by the CPU 50, thereby limiting an amount of power supply or, depending on the case, stopping power supply. To reset the external storage device in a low power consumption mode to a normal operation mode, the power control section 40 turns each of the media control section 10 and the interface section 30 to a normal operation mode, thereby re-starting power supply.

The CPU 50 performs control over each of the media control section 10, the interface section 30, the power control section 40 and other processing sections (not shown) in the external storage device. Specifically, the CPU 50 receives a result of monitoring for the media control section 10 by the monitoring section 20 and, based on the result, controls the power control section 40. Specifically, when the monitoring section 20 detects that data access to the recording media 100 by the media control section 10 can not be performed, the CPU 50 outputs to the power control section 40 an instruction for shift to a low power consumption mode. Accordingly, power supply to the interface section 30 and, depending on the case, the media control section 10 is limited, so that the external storage device is turned to a low power consumption mode, i.e., a power save mode. When the monitoring section 20 detects that data access to the recording media 100 by the media control section 10 can be performed, the CPU 50 outputs to the power control section 40 an instruction for reset to a normal operation state. Accordingly, power supply to the interface section 30 and media control section 10 is re-started and the external storage device is reset from a power save mode to a normal operation mode.

As has been described, the Serial ATA standard includes the power consumption control function by an external storage device itself and the function (which will be hereafter referred to as AN) of notifying a state of an external storage device asynchronously from the external storage device to a host device. Now, assuming that the external storage device according to this embodiment includes the interface section 30 complying with the Serial ATA standard, a power management method in which low power consumption control and AN are combined will be described.

Figure 3:
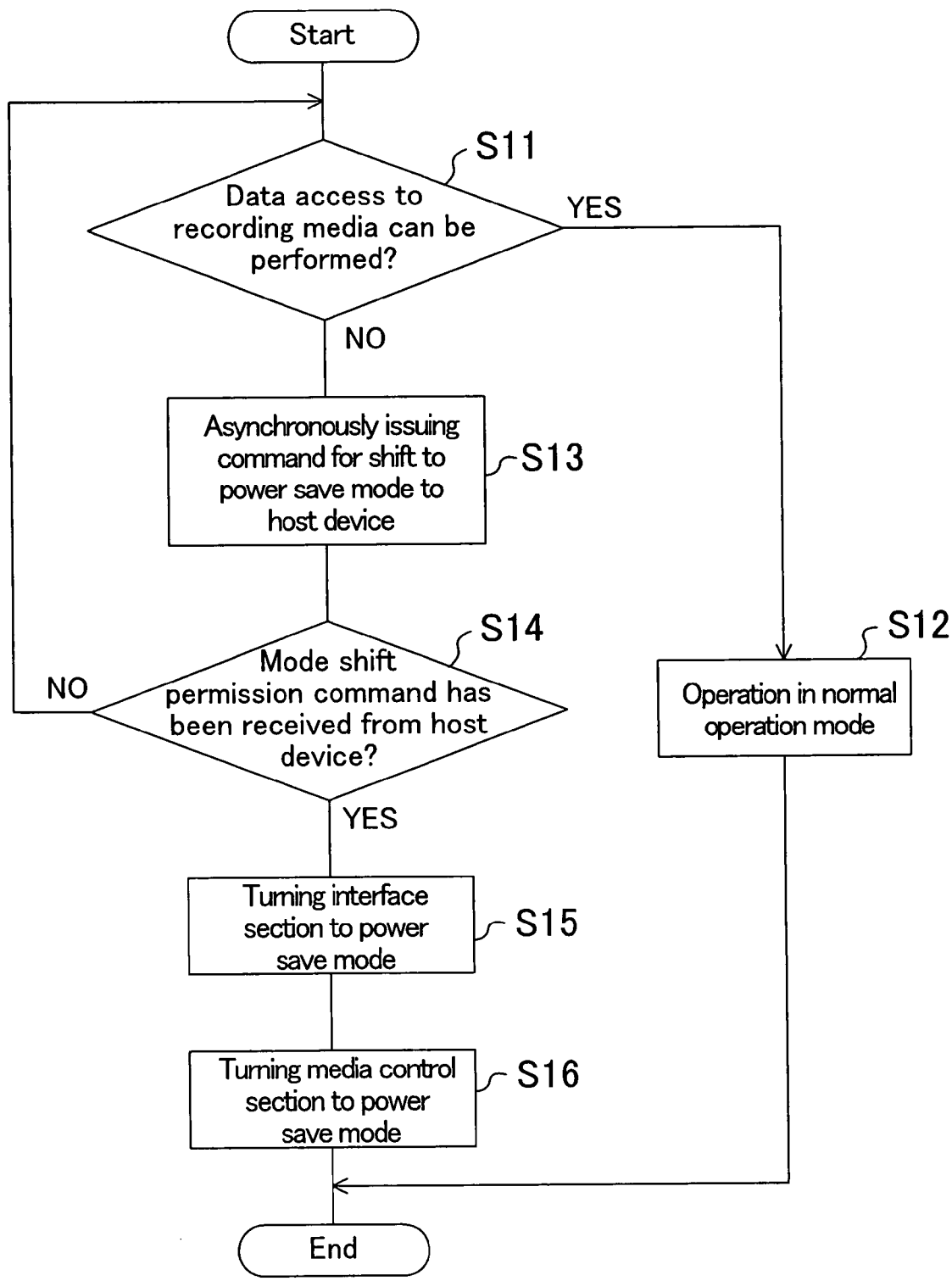
FIG. 3 is a flow chart showing steps for shifting an external storage device to a power save mode.

FIG. 3 is a flow chart showing steps for shifting an external storage device to a power save mode. First, judgment on whether or not data access to the recording media 100 by the external storage device can be performed is performed (S11). If data access can be performed, the external storage device is operated in a normal operation mode (S12). If data access can not be performed, a command of requiring a permission for shift to a power save mode is asynchronously issued to the host device 200 (S13). Specifically, a Partial command or a Slumber command is issued. Note that the description of these commands is given in the Serial ATA standard and, therefore, it will be omitted herein. Next, it is judged whether or not a command for allowing the external storage device to shift to a power save mode has been received from the host device 200 (S14). If the host device 200 denies shift to a power save mode, the process returns to Step S11 and, after it is judged whether or not data access to recording media 100 can be performed, a command of requesting a permission for shift to a power save mode is issued to the host device 200.

In Step S14, if a mode shift permission command is received from the host device 200, the interface section 30 shifts to a power save mode (S15). Specifically, the interface section 30 shifts a low power consumption mode and power supply to the interface section 30 is limited or, depending on the case, stopped. Thus, a PLL (Phase Locked Loop) circuit (not shown) in the interface section 30 and the like are stopped and a clock is not supplied to the interface section 30, so that an operation of the interface section 30 is stopped. The media control section 10 also shifts to a power save mode (S16). Specifically, power supply to the media control section 10 is limited or, depending on the case, stopped, and operations of a motor, an optical pickup (not shown) in the media control section 10 and the like are stopped.

By the above-described series of steps, the external storage device shifts to a power save mode. When the host device 200 complies with AN, in Step S15, a bias current flowing in the serial bus 300 can be stopped. Thus, further reduction in power consumption can be realized.

Next, a series of steps used when the external storage device in a power save mode is reset to a normal operation mode will be described. There are two cases for reset to a normal operation mode, i.e., the case where reset to a normal operation mode is performed according to a reset request from a host device and the case where a normal operation mode is performed at a judgment of the external storage device itself.

Figure 4:
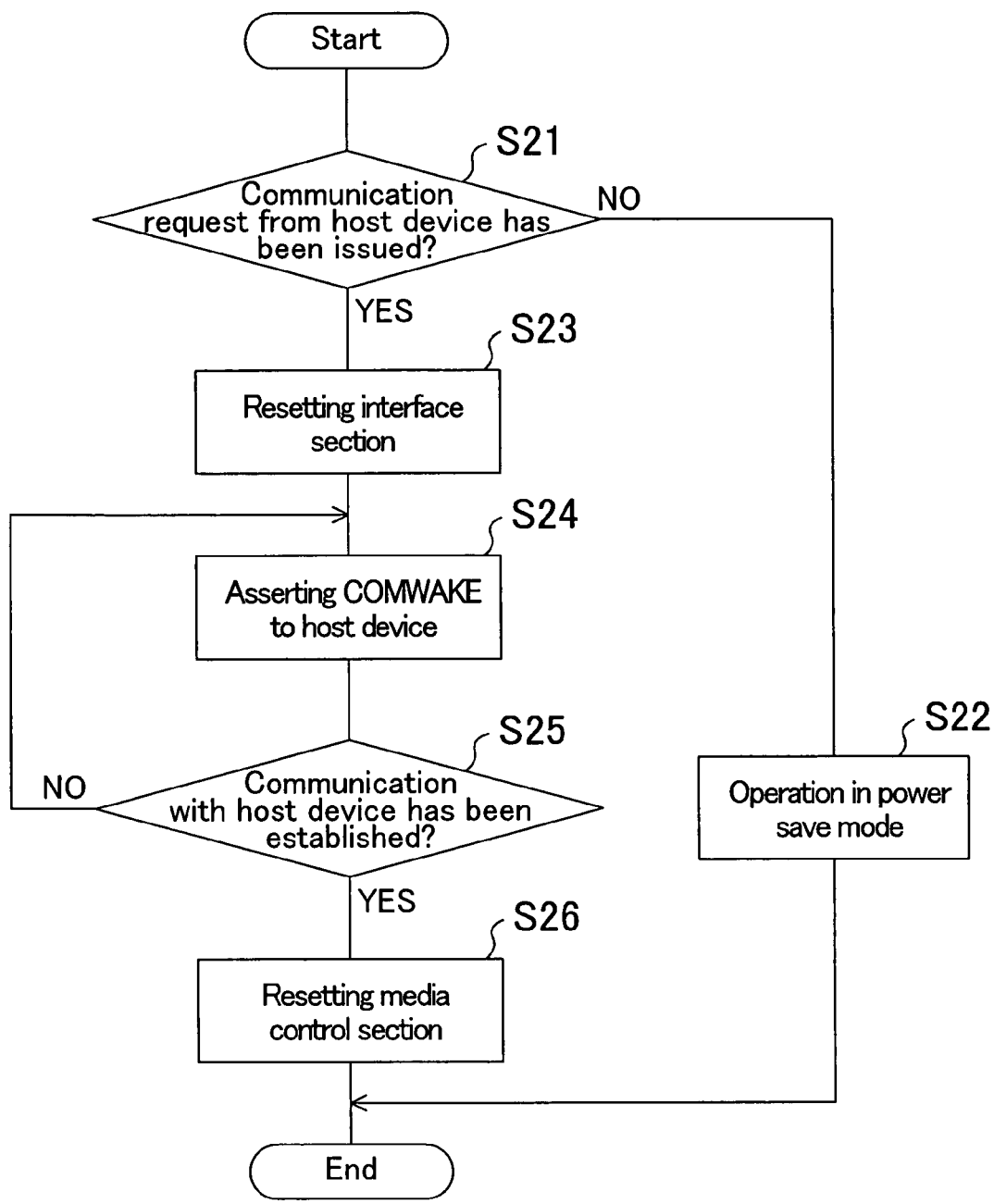
FIG. 4 is a flow chart showing steps for resetting an external storage device to a normal operation mode according to a request from a host device.

FIG. 4 is a flow chart showing steps for resetting an external storage device to a normal operation mode according to a request from a host device. First, whether or not a communication request is issued from the host device 200 is judged (S21). If a communication request is not issued, the external storage device is operated in a power save mode (S22). If a communication request (COMWAKE signal from the host device) is issued, power supply to a PLL circuit (not shown) in the interface section 30 in a power save mode and the like is re-started and also supply of a bias current to the serial bus 300 is re-started, so that the interface section 30 is reset to a normal operation mode (S23). Then, a COMWAKE signal is asserted to the host device 200 (S24) and whether or not communication with the host device 200 has been established is judged (S25). If the communication has not been established, the process returns to Step S24 and a COMWAKE signal is asserted again. If the communication has been established, power supply to a motor, an optical pickup (not shown) in the media control section 10 in a power save mode and the like is re-started and the media control section 10 is reset to a normal operation (S26).

FIG. 5 is a flow chart showing steps for resetting an external storage device to a normal operation mode at its own judgment. First, whether or not data access to the recording media 100 by the external storage device can be performed is judged (S31). If data access can not be performed, the external storage device is operated in a power save mode (S32). If data access can be performed, power supply to the media control section 10 and the interface section 30 in a power save mode is re-started and the interface section 30 is reset to a normal operation mode (S33 and S34). Next, a COMWAKE signal is asserted to the host device 200 (S35) and whether or not communication with the host device 200 has been established is judged (S36). If the communication has not been established, the process returns to Step S35 and a COMWAVE signal is asserted again.

After the communication has been established, whether or not reset to a normal operation mode when the external storage device is in an AN mode is performed is judged (S37). An AN mode means a state where each of a host device and an external storage device complies with AN and the external storage device asynchronously can communicate with the host device according to an instruction from the host device. If reset to a normal operation mode when the external storage device is not in an AN mode is performed, steps for reset to a normal operation mode are completed. If reset to a normal operation mode when the external storage device is in an AN mode is performed, a SDB (Set Device Bit) is asserted to the host device 200, thereby asynchronously notifying the host device 200 that the external storage device is reset to a normal operation mode, i.e., the external storage device can access to the recording media 100 (S38). In response to the notification, the host device 200 starts issuing a command for data access to the external storage device.

As described above, according to this embodiment, power management which is effective to a low power consumption operation is realized for an external storage device including a Serial ATA interface.

An interface of the external storage device of this embodiment is not limited to a Serial ATA interface. The above-described effects of the present invention can be also achieved for some other similar interface.

INDUSTRIAL APPLICABILITY

An external storage device according to the present invention, low power consumption control is performed according to whether or not data access to a recording media can be performed. Therefore, the external storage device is useful as an optical disk device, a tape storage drive, a removable hard disk drive, a memory card drive and the like in which a recording media can be exchanged. Specifically, the external storage device of the present invention is operable with low power consumption and thus is useful as an external storage device of a battery-driven host device.

The invention claimed is:

1. An external storage device which is configured to be connected to a host device to perform data communication with the host device and is configured to be switched between a normal operation mode and a power save mode, the external storage device comprising:
   a media control section configured to drive a recording media and perform data access to the recording media;
   a monitoring section configured to monitor whether the data access by the media control section can be performed or not;
   a control section configured to issue, when the external storage device is operated in the normal operation mode and it is detected by the monitoring section that the data access can not be performed, a command of requesting permission for shift to the power save mode to the host device and issue, when the external storage device is operated in the power save mode and it is detected by the monitoring section that the data access can be performed, a command of notifying the host device of shift to the normal operation;
   an interface section configured to perform data communication between the host device and the media control section; and
   a power control section configured to selectively limit, when the control section receives notification of permission for shift to the power save mode from the host device, power supply to the interface section and restart, when the control section issues the command of notifying the host device of shift to the normal operation mode, the power supply.

2. The external storage device of claim 1, wherein when the recording media is not set in the external storage device, the monitoring section detects that the data access can not be performed and, when the recording media is set in the external storage device, the monitoring section detects that the data access can be performed.

3. The external storage device of claim 1, wherein when the recording media is not compatible with the external storage device, the monitoring section detects that the data access can not be performed and, when the recording media is compatible with the external storage device, the monitoring section detects that the data access can be performed.

4. The external storage device of claim 1, wherein while the recording media is spinning up, the monitoring section detects that the data access can not be performed and, when the spinning up is completed, the monitoring section detects that the data access can be performed.

5. The external storage device of claim 1, wherein the interface section complies with a Serial ATA standard,
   when the control section receives the notification of permission for shift to the power save mode from the host device, the power control section limits supply of a bias current by the interface section to a serial bus for connecting the host device and the external storage device and, when the control section issues the command of notifying the host device of shift to the normal operation mode, the power control section re-starts the supply of the bias current, and
   when the power control section limits the supply of the bias current, it is asynchronously notified to the host device that the external storage device is in a state where data access can not be performed and, when the power control section re-starts the supply of the bias current, it is asynchronously notified to the host device that the external storage device is in a state where data access can be performed.

6. The external storage device of claim 1, wherein the power control section is configured to selectively stop, when the control section receives the notification of permission for shift to the power save mode from the host device, the power supply to the interface section and restart, when the control section issues the command of notifying the host device of shift to the normal operation mode, the power supply.

7. A power management method for an external storage device which includes a media control section for driving a recording media and performing data access to the recording media and an interface section for performing communication with a host device and is configured to be switched between a normal operation mode and a power save mode, the method comprising:
   a monitoring step of monitoring whether the data access by the media control section can be performed or not;
   a command issuing step of issuing, when the external storage device is operated in the normal operation mode and it is detected in the monitoring step that the data access can not be performed, a command of requesting permission for shift to the power save mode to the host device; and a power supply limiting step of selectively limiting, when the notification of permission for shift to the power save mode is received from the host device, power supply to the interface section.

8. The power management method of claim 7, wherein in the monitoring step, when the recording media is not set in the external storage device, it is judged that the data access can not be performed.

9. The power management method of claim 7, wherein in the monitoring step, when the recording media is not compatible with the external storage device, it is judged that the data access can not be performed.

10. The power management method of claim 7, wherein in the monitoring step, while the recording media is spinning up, it is judged that the data access can not be performed.

11. The power management method of claim 7, wherein the interface section complies with a Serial ATA standard,
   in the power supply limiting step, when the notification of permission for shift to the power save mode is received from the host device, supply of a bias current by the interface section to a serial bus for connecting the host device and the external storage device is limited, and
   the power management method further includes an asynchronous notification step of asynchronously notifying, when the supply of the bias current is limited in the power supply limiting step, the host device that the external storage device is in a state where data access can not be performed.

12. The power management method of claim 7, wherein the power supply limiting step includes selectively stopping, when the notification of permission for shift to the power save mode is received from the host device, the power supply to the interface section.

13. A power management method for an external storage device which includes a media control section for driving a recording media and performing data access to the recording media and an interface section for performing communication with a host device and is configured to be switched between a normal operation mode and a power save mode, the method comprising:
   a monitoring step of monitoring whether the data access by the media control section can be performed or not;
   a command issuing step of issuing, when the external storage device is operated in the power save mode and it is detected in the monitoring step that the data access can be performed, a command of notifying the host device of shift to the normal operation mode; and
   a power supply re-starting step of re-starting, when the command of notifying the host device of shift to the normal operation mode is issued in the command issuing step, power supply to the interface section for which power supply has been selectively limited.

14. The power management method of claim 13, wherein in the monitoring step, when the recording media is set in the external storage device, it is detected that the data access can be performed.

15. The power management method of claim 13, wherein in the monitoring step, when the recording media is compatible with the external storage device, it is detected that the data access can be performed.

16. The power management method of claim 13, wherein in the monitoring step, when spinning-up of the recording media is completed, it is detected that the data access can be performed.

17. The power management method of claim 13, wherein the interface section complies with a Serial ATA standard,
   in the power supply re-starting step, when the command of notifying the host device of shift to the normal operation mode is issued in the command issuing step, supply of a bias current to a serial bus for connecting the host device and the external storage device, for which bias current supply has been limited, is re-started, and
   the power management method further includes an asynchronous notification step of asynchronously notifying, when the supply of the bias current is re-started in the power supply re-starting step, the host device that the external storage device is in a state where data access can be performed.

18. The power management method of claim 13, wherein the power supply re-starting step includes re-starting, when the command of notifying the host device of shift to the normal operation mode is issued in the command issuing step, the power supply to the interface section for which power supply has been selectively stopped.

* * * * *

UNITED STATES PATENT AND TRADEMARK OFFICE
CERTIFICATE OF CORRECTION

Page 1 of 1

PATENT NO.       : 7,984,315 B2
APPLICATION NO.  : 11/665856
DATED            : July 19, 2011
INVENTOR(S)      : Hirotaka Ito It is certified that error appears in the above-identified patent and that said Letters Patent is hereby corrected as shown below:

Specifically, in Section (56), References Cited, U.S. Patent Documents, page 2, column 1, the seventh U.S. references reads:

2005/1023517 but should read 2005/0235171.

Signed and Sealed this
Twenty-seventh Day of March, 2012

David J. Kappos
*Director of the United States Patent and Trademark Office*